(12) United States Patent
Kwon et al.

(10) Patent No.: US 9,772,669 B2
(45) Date of Patent: Sep. 26, 2017

(54) POWER DEVICE, POWER CONTROL DEVICE, AND OPERATING METHOD THEREFOR

(71) Applicant: LG ELECTRONICS INC., Seoul (KR)

(72) Inventors: Younghwan Kwon, Seoul (KR); Jangwoong Park, Seoul (KR); Janghun Bae, Seoul (KR); Hyeonjae Lee, Seoul (KR); Seungryul Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 239 days.

(21) Appl. No.: 14/401,962

(22) PCT Filed: May 21, 2013

(86) PCT No.: PCT/KR2013/004417
§ 371 (c)(1),
(2) Date: Nov. 18, 2014

(87) PCT Pub. No.: WO2013/176449
PCT Pub. Date: Nov. 28, 2013

(65) Prior Publication Data
US 2015/0127122 A1    May 7, 2015

Related U.S. Application Data

(60) Provisional application No. 61/649,900, filed on May 21, 2012, provisional application No. 61/675,320, filed on Jul. 24, 2012.

(51) Int. Cl.
*G06F 1/32* (2006.01)
*G06F 11/30* (2006.01)
(Continued)

(52) U.S. Cl.
CPC ............ *G06F 1/3206* (2013.01); *G05B 15/02* (2013.01); *G05F 1/66* (2013.01); *G06F 11/3062* (2013.01);
(Continued)

(58) Field of Classification Search
CPC ........ G06F 1/26; G06F 1/3203; G06F 1/3206; G06F 1/3228; G06F 1/3293; G06F 2201/86; G06F 11/3062; G06F 11/3409
See application file for complete search history.

(56) References Cited

U.S. PATENT DOCUMENTS 6,353,893 B1 * 3/2002 Liu ................... G06F 1/3203
713/320
6,996,730 B2 * 2/2006 Bonnett ............. G06F 1/3203
713/300
(Continued)

FOREIGN PATENT DOCUMENTS

KR    10-2004-0103361 A    12/2004
KR    10-2005-0094247 A    9/2005
(Continued)

*Primary Examiner* — Crystal J Barnes-Bullock
(74) *Attorney, Agent, or Firm* — Dentons US LLP

(57) ABSTRACT

A method of operating a power control device that controls a power device includes subscribing an event for a change in a resource usage state of the power device; and receiving the event for the change in the resource usage state of the power device if the resource usage state of the power device is changed.

11 Claims, 17 Drawing Sheets

(51) Int. Cl.
*H04L 12/12* (2006.01)
*H04W 52/02* (2009.01)
*H04L 12/28* (2006.01)
*G05B 15/02* (2006.01)
*G05F 1/66* (2006.01)

(52) U.S. Cl.
CPC .......... *H04L 12/12* (2013.01); *H04L 12/282* (2013.01); *H04L 12/2803* (2013.01); *H04L 12/2827* (2013.01); *H04W 52/0254* (2013.01); *G05B 2219/2642* (2013.01); *G06F 2201/86* (2013.01); *Y02B 60/50* (2013.01)

(56) References Cited

U.S. PATENT DOCUMENTS

| | | | | |
|---|---|---|---|---|
| 7,996,694 B2* | 8/2011 | Bold | ........................ | G06F 1/206 713/300 |
| 8,245,062 B1* | 8/2012 | Nanda | .................. | G06F 1/3228 713/300 |
| 8,885,566 B2* | 11/2014 | Aoyagi | ............. | H04W 52/0235 370/328 |
| 9,448,680 B2* | 9/2016 | Woley | .................... | G06F 1/3209 |
| 2007/0016809 A1* | 1/2007 | Kida | ...................... | G06F 1/3203 713/300 |
| 2009/0007108 A1* | 1/2009 | Hanebutte | ........... | G06F 11/3409 718/1 |
| 2011/0213997 A1* | 9/2011 | Kansal | .................. | G06F 1/3203 713/324 |
| 2012/0303990 A1* | 11/2012 | Nanda | .................. | G06F 1/3228 713/324 |
| 2013/0041852 A1* | 2/2013 | Ellis | ....................... | G06Q 50/06 705/412 |

FOREIGN PATENT DOCUMENTS

| | | |
|---|---|---|
| KR | 10-2005-0112808 A | 12/2005 |
| KR | 10-2010-0063630 A | 6/2010 |
| KR | 10-1006499 B1 | 1/2011 |

* cited by examiner (a)

```xml
<?xml version="1.0" encoding="utf-8" ?>
<scpd xmlns="urn:schema-upnp-org:service-1-0" >
    <specVersion>
        <major>1</major>
        <minor>0</minor>
    </specVersion>
    <actionList>
            <!- added actions -->
            <action>
              <name> SetIdleTime </name>
                    <argumentList>
                    <argument>
                            <name> IdleTime </name>
                            <direction> in </direction>
                            <relatedStateVariable> IdleTime </relatedStateVariable>
                    </argument>
                    </argumentList>
            </action>
            <action>
            <name> GetIdleTime</name>
                    <argumentList>
                    <argument>
                            <name> IdleTime </name>
                            <direction> out </direction>
                            <relatedStateVariable> IdleTime </relatedStateVariable>
                    </argument>
                    </argumentList>
            </action>

<action>
              <name> SetWakeUpTime </name>
                    <argumentList>
                    <argument>
                            <name> WakeUpTime</name>
                            <direction> in </direction>
                            <relatedStateVariable>WakeUpTime </relatedStateVairable>
                    </argument>
                    </argumentList>
            </action>
            <action>
            <name>GetWakeUpTime</name>
                    <argumentList>
                    <argument>
                            <name>WakeUpTime</name>
                            <direction> out </direction>
                            <relatedStateVariable>WakeUpTime </relatedStateVairable>
                    </argument>
                    </argumentList>
            </action>
    </actionList>
```

FIG.18

```
<serviceStateTable>
        <!- added state variables -->
        <stateVariable sendEvent= "no" >
              <name> IdleTime </name>
              <dataType> Integer </dataType>
        </stateVariable>
        <stateVariable sendEvent= "no" >
              <name> WaitingTime </name>
              <dataType> Integer </dataType>
        </stateVariable>
        <stateVariable sendEvent= "no" >
              <name> WakeUpTime </name>
              <dataType> Time </dataType>
        </stateVariable>
    </serviceStateTable>
</scpd>
```

FIG.19

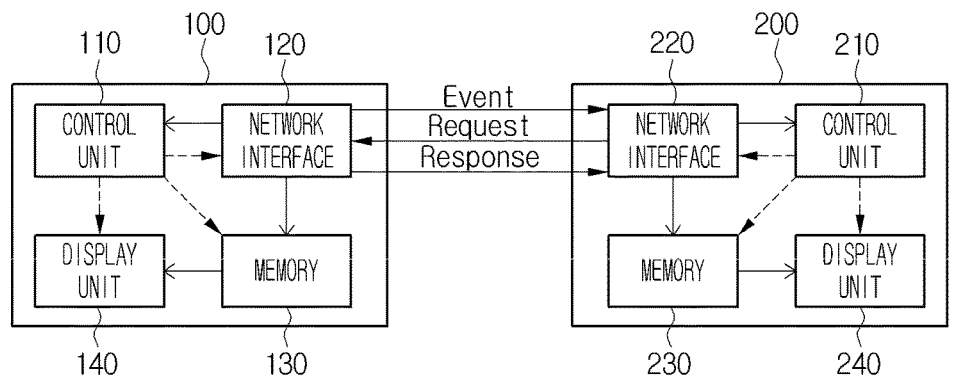

POWER DEVICE, POWER CONTROL DEVICE, AND OPERATING METHOD THEREFOR

This application is a 35 USC §371 National Stage entry of International Application No. PCT/KR2013/004417 filed on May 21, 2013, and claims priority of U.S. Provisional Application No. 61/649,900, filed on May 21, 2012 and 61/675,320, filed on Jul. 24, 2012 which are hereby incorporated by reference in its entirety.

TECHNICAL FIELD

The present invention relates to a power device, an online power control device, and an operating method of the power control device that may control power based on a home network.

BACKGROUND ART

As home network protocols, there are a universal plug and play (UPnP) technology and a digital living network alliance (DLNA) technology.

The UPnP technology and the DLNA technology enable the service and control between consumer electronics of various manufacturers. In particular, the UPnP technology enables the compatible audio/visual (AV) service and control between pieces of AV equipment. The compatible AV service includes media streaming, uploading, downloading, etc.

The DLNA regulates a digital media server (DMA), a digital media player (DMP), a digital media renderer (DMR), a digital media controller (DMC), and a digital media printer (DMPr) as a home network device, and regulates a mobile digital media server (M-DMS), a mobile digital media player (M-DMP), a mobile digital media uploader, (M-DMU), a mobile digital media downloader (M-DMD), and a mobile digital media controller (M-DMC) as a mobile portable device.

The digital media server (DMS) is used as an idea of covering the M-DMS, the digital media player (DMP) is used as an idea of covering the M-DMP, and the digital media controller (DMC) is used as an idea of covering the M-DMC.

The UPnP classifies such devices into a control point (CP) device and a control target device. The digital media controller (DMC) and the digital media player (DMP) are classified as the control point device, and the digital media renderer (DMR), the digital media server (DMS), and the digital media printer (DMPr) may be classified as the control target device.

The LDNA defines a two box model and a three box model.

The two box model includes the digital media player (DMP) and the digital media server (DMS). In the case of the two box model, the digital media player (DMP) allows a user to find and play content that is browsed and distributed by the digital media server (DMS).

The three box model includes the digital media controller (DMC), the digital media server (DMS), and the digital media renderer (DMR). In the case of the three box model, the digital media controller (DMC) allows the user to find the DMS's content to be played by the digital media renderer (DMR).

Equipment conforming to the UPnP and the DLNA gives and receives commands through internet protocol networking (IP networking). That is, one of connected pieces of AV equipment may provide an AV service to another piece of equipment, receive an AV service from another piece of equipment, control another piece of equipment, and be controlled by another piece of equipment.

However, there is a limitation in that the resource usage state (for example, a state during a service) of a power device supporting a low power mode (for example, digital media server (DMS)) in order to prevent power consumption and states of various physical or logical devices of equipment are not considered typically. That is, when a power device that is using a resource receives from a power control device a request for changing to a low power state, an existing service stops and thus a user who is using the power device may experience inconvenience.

In addition, when the power device that is using the resource rejects the request from the power control device for changing to the low power state, there is a limitation in that the power control device determines that there is an error in the power device or the power control device because the power control device does not know why the request is rejected.

In addition, since existing equipment conforming to the UPnP and the DLNA may change a power state by an external request and may not change parameters for changing the power state due to an internal factor, it may be difficult to dynamically respond to external requests.

DISCLOSURE OF THE INVENTION

Technical Problem

The present invention is intended to minimize user inconvenience by clearly notifying the user of a resource usage state of a power device through an event related to a change in the resource usage state.

In addition, the present invention is intended to enhance power efficiency of equipment and user convenience by changing a power state in response to a request from network equipment.

Technical Solution

A method of operating a power control device that controls a power device includes subscribing an event for a change in a resource usage state of the power device; and receiving the event for the change in the resource usage state of the power device if the resource usage state of the power device is changed.

A set of values that is represented by the resource usage state may include a first state in which a resource is being used, and a second state in which the resource is not being used.

The resource usage state may represent a network interface mode of the power device.

A set of values that is represented by the network interface mode may include at least one of: a first mode in which the network interface operates, a second mode in which the network interface mode does not operate periodically, a third mode in which the network interface is down, a fourth mode in which the network interface is down and an IP network interface wakes up externally, a fifth mode in which the network interface is down and wakes up internally, and a sixth mode in which the network interface is down and wakes up internally or externally.

The first state may include at least one of the first mode and the second mode, and the second state may include at least one of the third mode to the sixth mode.

The method may further include displaying an operating state of the power device on the basis of the resource usage state of the power device; obtaining a user input for changing the operating state of the power device; and transmitting to the power device an operating state change request message that requests to change the operating state of the power device according to the user input.

A set of values that the operating state represents may include an active state and a low power state.

The operating state may correspond to a power state of the power device.

The displaying of the operating state of the power device may include displaying operating states of a plurality of devices that includes the power device.

The obtaining of the user input may include obtaining a user input for changing the operating state of the power device to a low power state, and the operating state change request message may request to change the operating state of the power device to the low power state.

The obtaining of the user input may include obtaining a user input for changing the operating state of the power device to an active state, and the operating state change request message may request to change the operating state of the power device to the active state.

In another embodiment, a method of operating a power device that is controlled by a power control device includes subscribing an event for a change in a resource usage state of the power device by the power control device; and transmitting to the power control device the event for the change in the resource usage state of the power device if the resource usage state of the power device is changed.

A set of values that the resource usage state represents may include a first state in which a resource is being used, and a second state in which the resource is not being used.

The resource usage state may represent a network interface mode of the power device.

A set of values that the network interface mode represents may include at least one of: a first mode in which the network interface operates, a second mode in which the network interface mode does not operate periodically, a third mode in which the network interface is down, a fourth mode in which the network interface is down and an IP network interface wakes up externally, a fifth mode in which the network interface is down and wakes up internally, and a sixth mode in which the network interface is down and wakes up internally or externally.

The first state may include at least one of the first mode and the second mode, and the second state may include at least one of the third mode to the sixth mode.

In further another embodiment, a power control device controlling a power device includes a network interface; and a control unit, wherein the control unit subscribes an event for a change in a resource usage state of the power device through the network interface, and receives the event for the change in the resource usage state of the power device if the resource usage state of the power device is changed.

The power control device may further include a display unit, wherein the control unit may display an operating state of the power device on the basis of the resource usage state of the power device through the display unit, obtain a user input for changing the operating state of the power device, and transmit to the power device an operating state change request message that requests to change the operating state of the power device according to the user input.

A set of values that the operating state represents may include an active state and a low power state.

The control unit may display operating states of a plurality of devices that includes the power device.

Advantageous Effects

According to embodiments of the present invention, user inconvenience may be minimized by clearly notifying the user of a resource usage state of a power device through an event related to a change in the resource usage state.

In addition, embodiments of the present invention, power efficiency of equipment and user convenience may be enhanced by changing a power state in response to a request from network equipment.

Other various effects are explicitly or implicitly disclosed in the detailed description according to embodiments of the present invention to be described below.

BRIEF DESCRIPTION OF THE DRAWINGS

FIG. 17 shows XML service description on various actions for changing the power state of a low power device by a low power control device according to an embodiment of the present invention;

FIG. 18 shows XML service description on a plurality of state variables that a low power device manage; and FIG. 19 describes a configuration of two box model equipment according to an embodiment of the present invention.

MODE FOR CARRYING OUT THE INVENTION

Exemplary embodiments of the present invention will be described below in detail with reference to the accompanying drawings so that a person of ordinary skill in the art may easily practice the present invention.

A low power device 100 may be named a low lower endpoint below. In addition, when an embodiment of the present invention uses DLNA technology, the lower power device 100 may be any one of a DIGITAL MEDIA RENDERER (DMR), a digital media server (DMS), a digital media printer (DMPr), and a low power control device 200 may be any one of devices having a control function, such as a digital media controller (DMC) or a digital media player (DMP). When the embodiment of the present invention uses UPnP technology, the low power device 100 may be a controlled device and the low power control device 200 may be a control point (CP) device.

In addition, when the embodiment of the present invention uses the DLNA technology, the lower power device 100 may be a component of any one of the digital media renderer (DMR), digital media server (DMS), and digital media printer (DMPr) and the low power control device 200 may also be a component of any one of devices having a control function, such as the digital media controller (DMC) or digital media player (DMP). In addition, when the embodiment of the present invention uses the UPnP technology, the lower power device 100 may be a component of the controlled device and the low power control device 200 may be a component of the CP device.

In addition, a power mode and a power state may be the same ideas below. An active mode and an active state, a low power mode and a low power state, and a sleep mode and a sleep state may also be the same ideas below.

Next, an embodiment of the present invention will be described with reference to FIG. 1.

Figure 1:
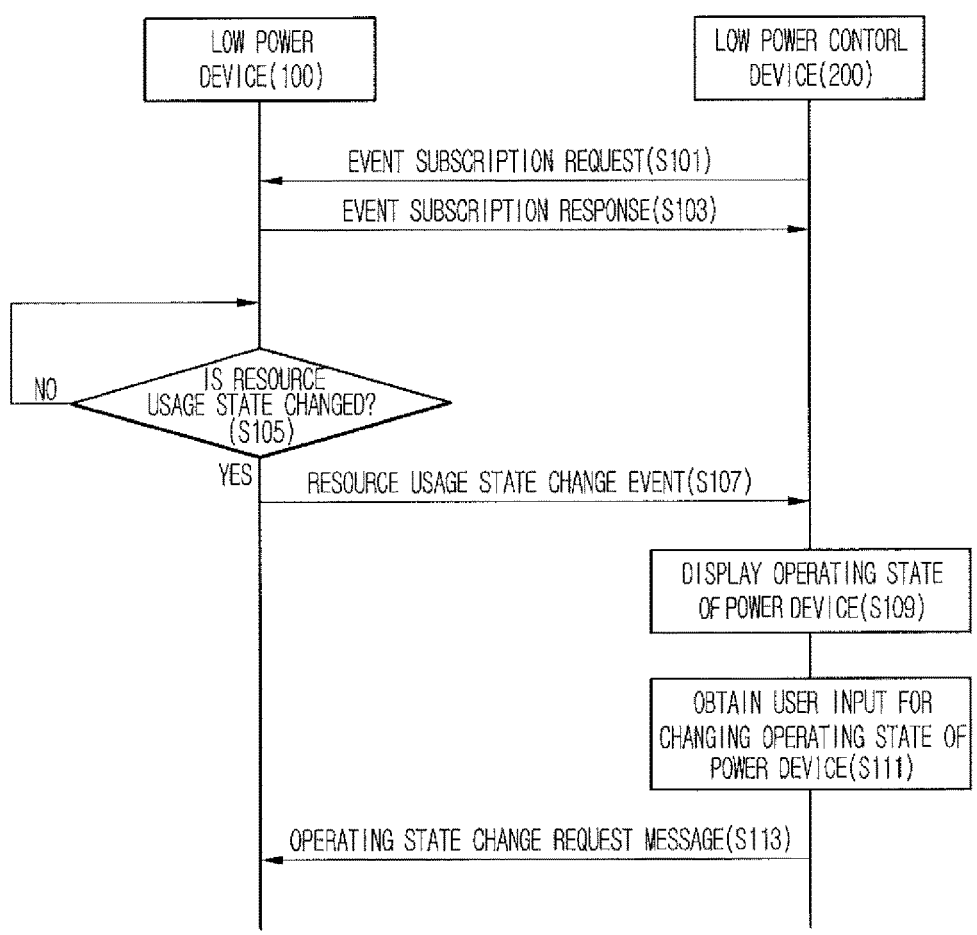
FIG. 1 is a ladder diagram for describing operating methods of a low power device and a low power control device according to an embodiment of the present invention.

FIG. 1 is a ladder diagram for describing operating methods of a low power device and a low power control device according to an embodiment of the present invention.

Referring to FIG. 1, the low power device 100 receives an event subscription request for a change in a resource usage state from the low power control device 200 in step S101. In one embodiment, the event subscription request may be a request for subscribing an event for receiving, from the low power device 100 by the low power control device 200, an event that notifies a change in the resource usage state. In one embodiment, the resource usage state may be a usage state of a component that configures the low power device 100. For example, it may be any one of a usage state of a control unit in the low power device 100, a usage state of a display unit, a usage state of a memory, and a usage state of a network interface (or IP network interface).

In another embodiment, the resource usage state may indicate when the low power device 100 provides or receives a service.

In another embodiment, the resource usage state may indicate a network interface mode o the low power device 100. The network interface mode may be related to a power state of a network interface of the low power device 100.

A set of values that the resource usage state may represent may include a first state in which a resource of the low power device 100 is being used, and a second state in which a resource of the low power device 200 is not being used. When the resource usage state represents the network interface mode, the network interface mode may include a first mode IP-up in which an IP network interface may operate, a second mode IP-up-Periodic in which the IP network interface may not be periodically available, a third mode IP-down-no-Wake in which the IP network interface is down, a fourth mode IP-down-with-WakeOn in which the IP network interface is down and may wake externally, a fifth mode IP-down-with-WakeAuto in which the IP network interface is down and may wake internally, and a sixth mode IP-down-with-WakeOnAuto in which the IP network interface may wake internally or externally.

The first state in which the resource of the low power device 100 is being used may include at least one of the first mode and the second mode, and the second state in which the resource of the low power device 200 is not being used may include at least one of the third mode to the sixth mode.

In the following description, the first state may be an active state and the second state may be a sleep state.

In addition, a network interface mode may be an element of an evented X_DLNA_NetworkInterfaceMode state variable. In order for the eventing processing the of the X_DLNA_NetworkInterfaceMode state variable to have the meaning, the network interface needs to have an IP address and to be able to send an UPnP event message and a changed value of the X_DLNA_NetworkInterfaceMode state variable needs to be evented.

A parameter value of the network interface mode may be any one of Unimplemeted, IP-up, IP-up-Periodic, IP-down-no-Wake, IP-down-with-WakeOn, IP-down-with-WakeAuto and IP-down-with-WakeOnAuto. When the parameter value of the network interface mode is Unimplemented, it may represent that there is no information on the low power mode of the network interface of the low power device 100. That is, when the parameter value of the network interface mode is Unimplemented, the low power device 100 may be a device that does not support both an active mode and a low power mode.

When the parameter value of the network interface mode is IP-up, it may represent that the IP network interface may completely operate and UPnP services are available. In an embodiment, when the parameter value of the network interface mode is IP-up, it may represent that the IP network interface is providing a service to another device or is using a resource. When the parameter value of the network interface mode is IP-up, it may represent an active state in which the low power device 100 provides a service.

When the parameter value of the network interface mode is IP-up-Periodic, it may represent that a physical interface is unavailable periodically for a period equal to or shorter than two seconds if the physical interface is in a low power mode.

If the parameter value of the network interface mode is IP-down-no-Wake, it may represent that the IP network interface is down.

If the parameter value of the network interface mode is IP-down-with-WakeOn, the IP network interface is down and may wake externally.

If the parameter value of the network interface mode is IP-down-with-WakeAuto, it may represent that the IP network interface is down in a doze state for a time equal to or longer than two seconds. The IP network interface may wake internally.

When the parameter value of the network interface mode is IP-down-with-WakeOnAuto, it may represent that the IP network interface is down in the doze state for a time equal to or longer than two seconds. The IP network interface may wake internally or externally.

The low power device 100 transmits a event subscription request in response to the event subscription request received from the low power control device 200 in step S103. The subscribe event response may be a response to providing an event notifying a change in a resource usage state of the low power device 100 to the low power control device 200. If the low power control device 200 explicitly subscribes an event of the low power device 100, it may listen an event related to a change in a resource usage state of the low power device 100. For example, after the low power control device 200 subscribes an event related to a network interface mode, it may recognize when the network interface mode of the low power device 100 is changed.

Steps S101 and S103 may be performed when unicast eventing occurs between the low power device 100 and the low power control device 200. If multicast eventing occurs between the low power device 100 and the low power control device 200, steps S101 and S103 may be skipped.

Subsequently, the low power device 100 checks whether a resource usage state is changed, in step S105. That is, the low power device 100 may check whether the resource usage state is changed from the first state in which the resource of the low power device 100 is being used, to the second state in which the resource thereof is not being used. In addition, the lower power device 100 may check whether the resource usage state is changed form the second state in which the resource of the low power device 100 is not being used, to the first state in which the resource thereof is being used. For example, the low power device 100 may check whether the resource usage state is changed from a state in which the low power device provides a service to another device, to a state in which the low power device does not so, or from the state in which the low power device does not provide the service to another, to the state in which the low power device does so.

In addition, when the resource usage state represents the network interface mode of the low power device 100 and the low power device 100 is in the second state, the low power device 100 may check to which of the third mode to the sixth mode that the second state include the resource usage state is changed, a resource being not being used in the second state. For example, if the low power device 100 changes from the third mode of the second state to the fourth, the low power device 100 may check this.

As a result of checking the resource usage state, if it is revealed that the resource usage state is changed, the low power device 100 transmits an event related to a change in the resource usage state to the low power control device 200 in step S107. That is, if the resource usage state is changed from the first state in which the resource of the low power device 100 is being used, to the second state in which the resource thereof is not being used, the low power device 100 may transmit to the low power control device 200 an event notifying that the resource usage state is changed from the first state to the second state. In addition, if the resource usage state is changed from the second state in which the resource of the low power device 100 is not being used, to the second state in which the resource thereof is being used, the low power device 100 may transmit to the low power control device 200 an event notifying that the resource usage state is changed from the second state to the first state.

The low power control device 200 listens an event related to a change in the resource usage state listened from low power device 100 and displays an operating state of the low power device 100, in step S109. The operating state of the low power device 100 may represent according to the resource usage state of the low power device 100 that the resource of the low power device 100 is available or unavailable.

A set of values that the operating state of the low power device 100 may not represent may include an active state and a low power state.

The active state may be a state in which the resource of the low power device 100 may be used.

The low power state may be a state in which the resource of the low power device 100 may be used and a state in which power consumption may decrease because the usage of the resource decreases as compared to the active state. The low power state may be a sleep state or a state in which a service of the low power device 100 may not be used.

The processes of displaying the operating state of the low power device 100 will be descried in detail with reference to FIGS. 7 to 10.

The low power control device 200 obtains a user input for changing the operation state of the low power device 100 in step S111. In an embodiment, the user input for changing the operating state may be an input for changing the low power device 100 from a low power state to an active state. In another embodiment, the user input for changing the operating state may be a user input for changing the low power device 100 from the active state to the low power state. The process of obtaining the user input for changing the operating state of the low power device 100 will be described in detail with reference to FIGS. 7 to 10.

The low power control device 200 transmits to the low power device 100 a message related to a operating state change request that requests to change the operating state of the low power device 100 according to the obtained user input, in step S113. In an embodiment, the message related to the operating state change request may be a request message for changing the low power device 100 from the low power state to the active state. In another embodiment, the message related to the operating state change request may be a request message for changing the low power device 100 from the active state to the low power state.

Figure 2:
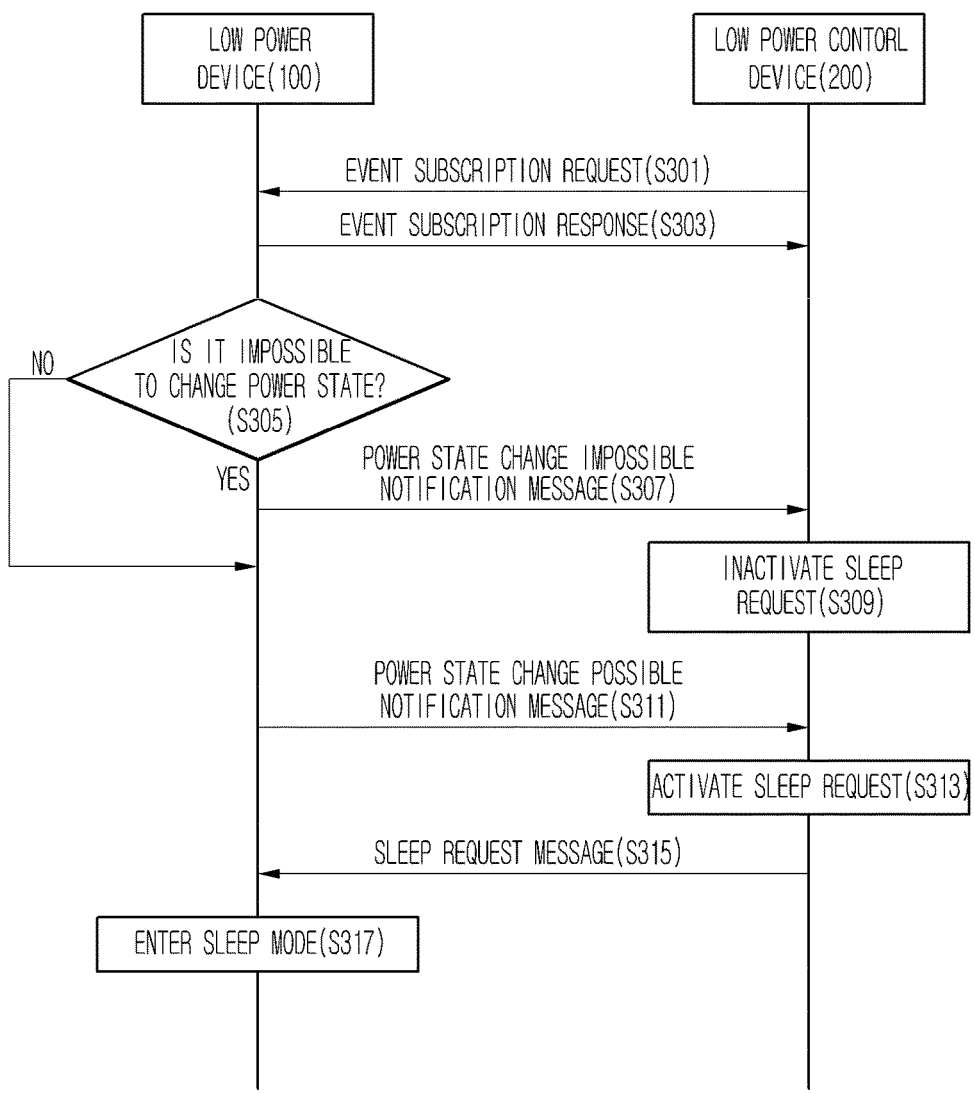
FIG. 2 is a ladder diagram for describing operating methods of a low power device and a low power control device according to another embodiment of the present invention.

FIG. 2 is a ladder diagram for describing operating methods of a low power device and a low power control device according to another embodiment of the present invention.

Referring to FIG. 2, a low power device 100 listens a event subscription request from a low power control device 200 in step S301. In an embodiment, the event subscription request may be a event subscription request for listening an event for notifying a change in a power state from the low power device 100 by the low power control device 200.

The low power device 100 transmits a subscribe event response in response to the event subscription request received from the low power control device 200 in step S303. The subscribe event response may be a response to providing to the low power control device 200 an event notifying a change in a power state of the low power device 100. If the low power control device 200 explicitly subscribes an event of the low power device 100, it may receive the power state of the low power device 100 (whether the low power device 100 is servicing). That is, if the low power control device 200 subscribes the event of the low power device 100, it may recognize when a network interface mode of a network interface of the low power device 100 is changed.

Steps S301 and S303 may be performed when unicast eventing occurs between the low power device 100 and the low power control device 200. If multicast eventing occurs between the low power device 100 and the low power control device 200, steps S101 and S103 may be skipped.

Subsequently, the low power device 100 checks its power state and then checks whether it is impossible to change the power state to a sleep mode, in step S305. If it is impossible to change the power state to the sleep mode, the low power device 100 transmits to the low power control device a message notifying that it is impossible to change the power state (hereinafter, referred to as power state change impossible notification message), in step S307. In an embodiment, a case where the low power device 100 may not change its power state to the sleep mode may be when the low power device 100 provides a service to other equipment by using its resource.

When the low power device 100 changes its power state, it may check whether the low power device provides or receives a service to or from other equipment. If the low power device 100 neither provides nor receives the service to other equipment, the low power device 100 may change its power state to the sleep mode. Otherwise, the low power device 100 may not change its power state or may change its power state after notifying other equipment of a change in its power state.

The low power control device 200 receives the power state change impossible notification message from the low power device 100, confirms that the low power device 100 may not change its power state to the sleep mode, and inactivates a sleep request, in step S309. In an embodiment, the inactivation of the sleep request may be displayed on a user interface screen that is provided by the low power control device 200. This matter will be described below with reference to FIGS. 7 to 10.

The low power device 100 checks its power state and checks whether it is impossible to change the power state to the sleep mode in step S305. If it is possible to change the power state to the sleep mode, the low power device 100 transmits a power state change possible notification message to the low power control device 200 in step S311. A case where it is possible to change the power state may be when a resource usage state ends, for example when a situation where the low power device 100 provides a service to other equipment ends.

The low power control device 200 receives the power state change possible notification message from the low power device 100, confirms that the low power device 100 may change its power state to the sleep mode, activates a sleep request, in step S313, and transmits a sleep request message to the low power device 100 in step S315. In an embodiment, the activation of the sleep request may be displayed on the user interface screen that is provided by the low power control device 200. This matter will be described below with reference to FIGS. 7 to 10.

In an embodiment, the sleep request message may correspond to action GotoSleep( ) of UPnP protocol.

The low power device 100 receives the sleep request message from the low power control device 200 and enters a sleep mode in step S317.

Figure 3:
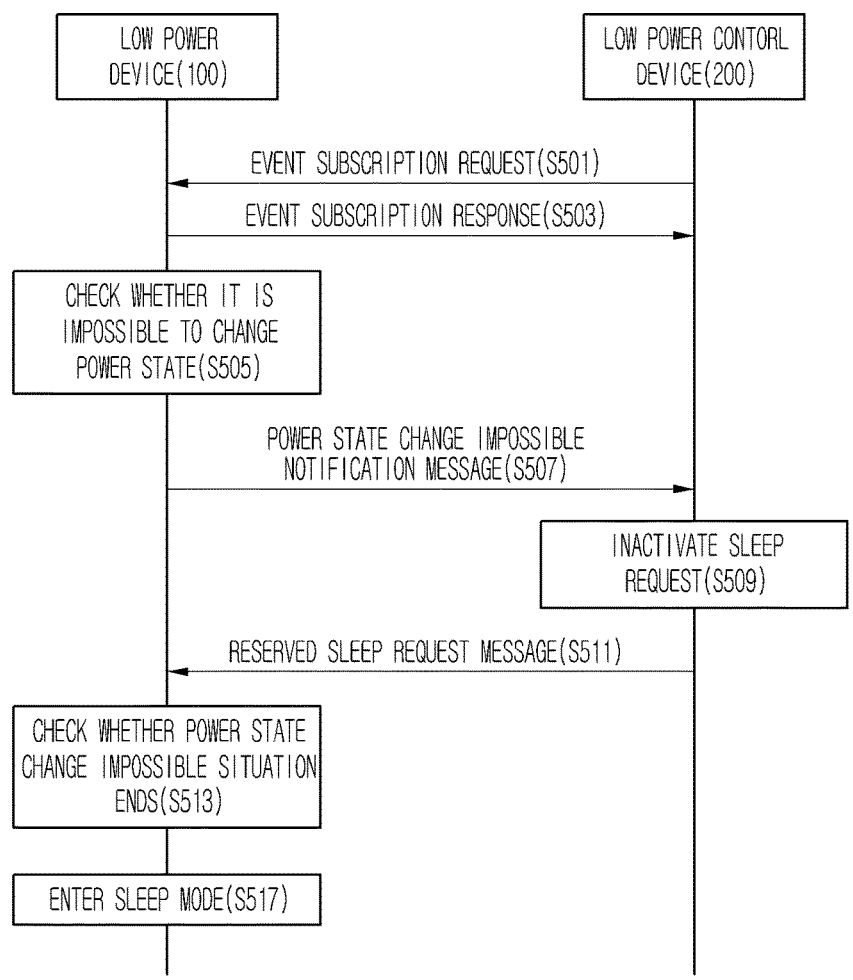
FIG. 3 is a ladder diagram for describing operating methods of a low power device and a low power control device according to another embodiment of the present invention.

FIG. 3 is a ladder diagram for describing operating methods of a low power device and a low power control device according to another embodiment of the present invention.

Detailed descriptions on the previously described steps are skipped in FIG. 3.

Referring to FIG. 3, the low power device 100 receives an event subscription request from the low power control device 200 in step S501.

The low power device 100 transmits an event subscription response in response to the event subscription request received from the low power control device 200 in step S503.

Subsequently, the low power device 100 checks its power state and confirms that that it is impossible to change the power state to the sleep mode in step S505, and transmits a power state change impossible notification message to the low power control device 200 in step S507.

The low power control device 200 receives the power state change impossible notification message from the low power device 100, confirms that the low power device 100 may not change its power state to the sleep mode, and inactivates a sleep request, in step S509.

Subsequently, the low power control device 200 transmits a reserved sleep request message in response to the power state change impossible notification message received from the low power device 100 in step S511. The reserved sleep request message may be a request message that allows the low power device 100 to automatically enter the sleep mode if a network interface mode representing the power state of the low power device 100 is changed to the sleep mode. In an embodiment, the reserved sleep request message may correspond to action ScheduledGotoSleep( ) of UPnP protocol.

The low power device 100 receives the reserved sleep request message and checks whether a power state change impossible situation ends, in step S513.

If the power state change impossible situation ends, the low power device 100 enters the sleep mode in step S517. That is, the low power device 100 may enter the sleep mode if the power state of the low power device may be changed to the sleep mode according to the reception of the reserved sleep request message.

Figure 4:
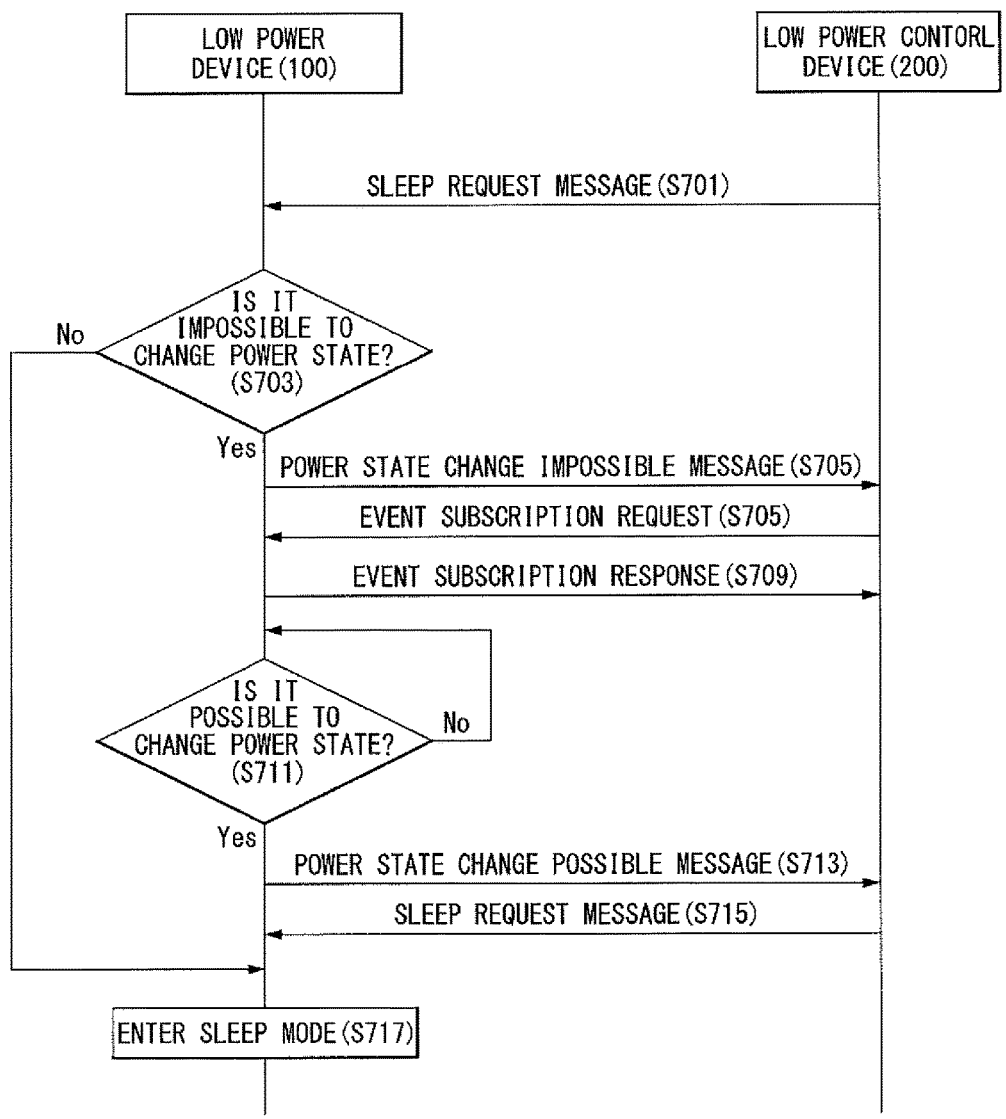
FIG. 4 is a ladder diagram for describing operating methods of a low power device and a low power control device according to another embodiment of the present invention.

FIG. 4 is a ladder diagram for describing operating methods of a low power device and a low power control device according to another embodiment of the present invention.

Referring to FIG. 4, the low power device 100 receives a sleep request message from the low power control device 200 in step S701.

The low power device 100 checks its power state according to the reception of the sleep request message and checks whether it is impossible to change the power state to a sleep mode, in step S703. If it is impossible to change the power state to the sleep mode, the low power device 100 transmits a power state change impossible notification message to the low power control device 200 in step S705. In an embodiment, the power state change impossible notification message may include an error message that includes why the low power device 100 may not change its power state to the sleep mode.

If an error occurs because the low power device 100 may not change its power state to the sleep mode, the low power device 100 may transmit to the low power control device 200 error codes such as those in Table 1 below.

TABLE 1

| Error Code | Error Description | Description |
|---|---|---|
| 708 | servicing | Device refused to change power state due to Device Servicing |
| 709 | S/W Updating | Device refused to change power state due to S/W Updating |
| 710 | (F/W Updating) | Device refused to change power state due to F/W Updating |
| 711 | Device Protecting | Device refused to change power state due to Device Protecting |
| 712 | Unauthorized | Device refused to change power state due to Unauthorized request |

Subsequently, the low power control device 200 transmits an event subscription request to the low power device 100 in response to the reception of the power state change impossible message in step S707. In an embodiment, the event subscription request may be one for receiving an event notifying that an error situation of the low power device 100 ends.

The low power device 100 transmits an event subscription response in response to the event subscription request that is received from the low power control device 200, in step S709. That is, the event subscription request and the event subscription response may be transmitted/received when the low power control device 200 receives the power state change impossible message after requesting to change the power state of the low power device 100 (for example, to the sleep mode). The event subscription response may be a response to providing to the low power control device 200 an event notifying that the error situation of the low power device 100 ends.

Subsequently, the low power device 100 checks whether it is possible to change its power state to the sleep mode, in step S711, and if positive, transmits a power state change possible notification message to the low power control device 200 in step S713.

The low power control device 200 transmits a sleep request message to the low power device 100 according to the reception of the power state change possible notification message in step S715, and the low power device 100 receives the sleep request message and enters the sleep mode in step S717. That is, although the low power device 100 refuses the sleep request from the low power control device 200, the low power device 100 may change its power state after it ends a service.

Figure 5:
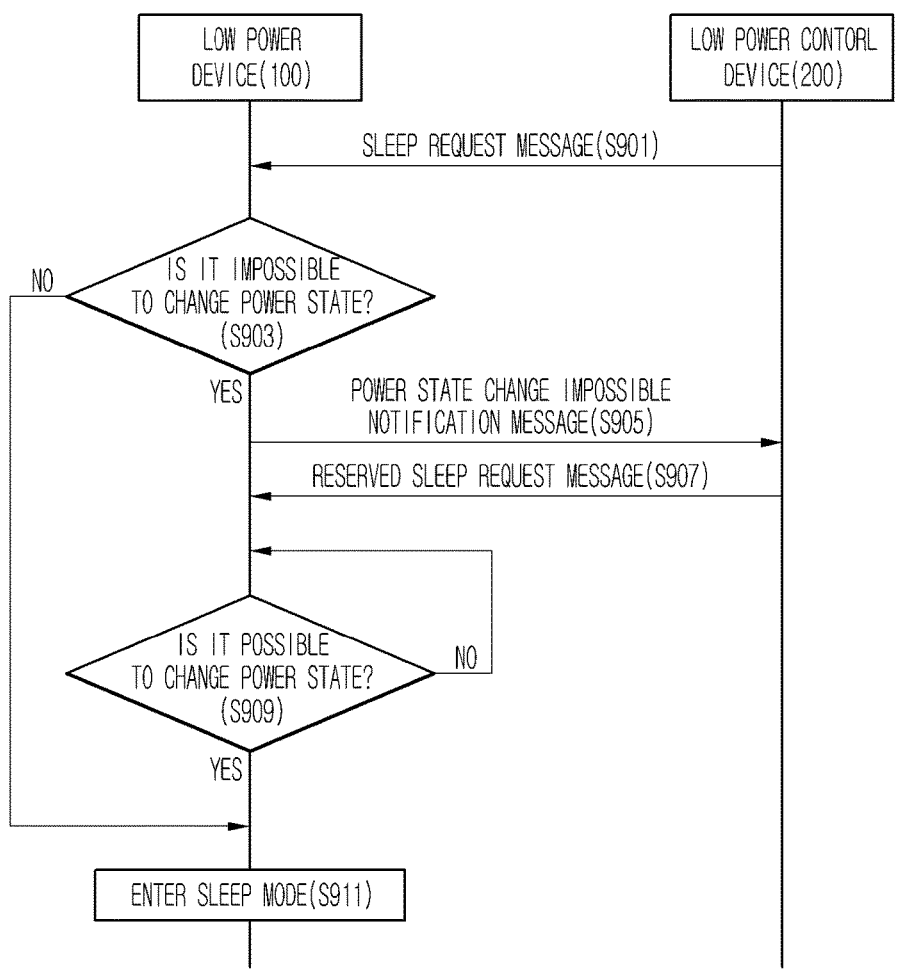
FIG. 5 is a ladder diagram for describing operating methods of a low power device and a low power control device according to another embodiment of the present invention.

FIG. 5 is a ladder diagram for describing operating methods of a low power device and a low power control device according to another embodiment of the present invention.

Referring to FIG. 5, the low power device 100 receives a sleep request message from the low power control device 200 in step S901.

The low power device 100 checks its power state according to the reception of the sleep request message and checks whether it is impossible to change the power state to a sleep mode, in step S903. If it is impossible to change the power state to the sleep mode, the low power device 100 transmits a power state change impossible notification message to the low power control device 200 in step S905. In an embodiment, the power state change impossible notification message may include an error message that includes why the low power device 100 may not change its power state to the sleep mode.

If an error occurs because the low power device 100 may not change its power state to the sleep mode, the low power device 100 may transmit to the low power control device 200 the error codes as described in FIG. 4.

The low power control device 200 transmits a reserved sleep request message in response to the power state change impossible notification message received from the low power device 100 in step S907.

The low power device 100 checks its power state according to the reception of the reserved sleep request message checks whether it is possible to change to the sleep mode in step S909, and if positive, enters the sleep mode in step S911.

In an embodiment, the power state change impossible notification message in step S905 may include a response notifying that the low power device 100 automatically enters the sleep mode if the error situation ends. In this case, the process of transmitting the reserved sleep request message of FIG. S907 may be skipped.

Figure 6:
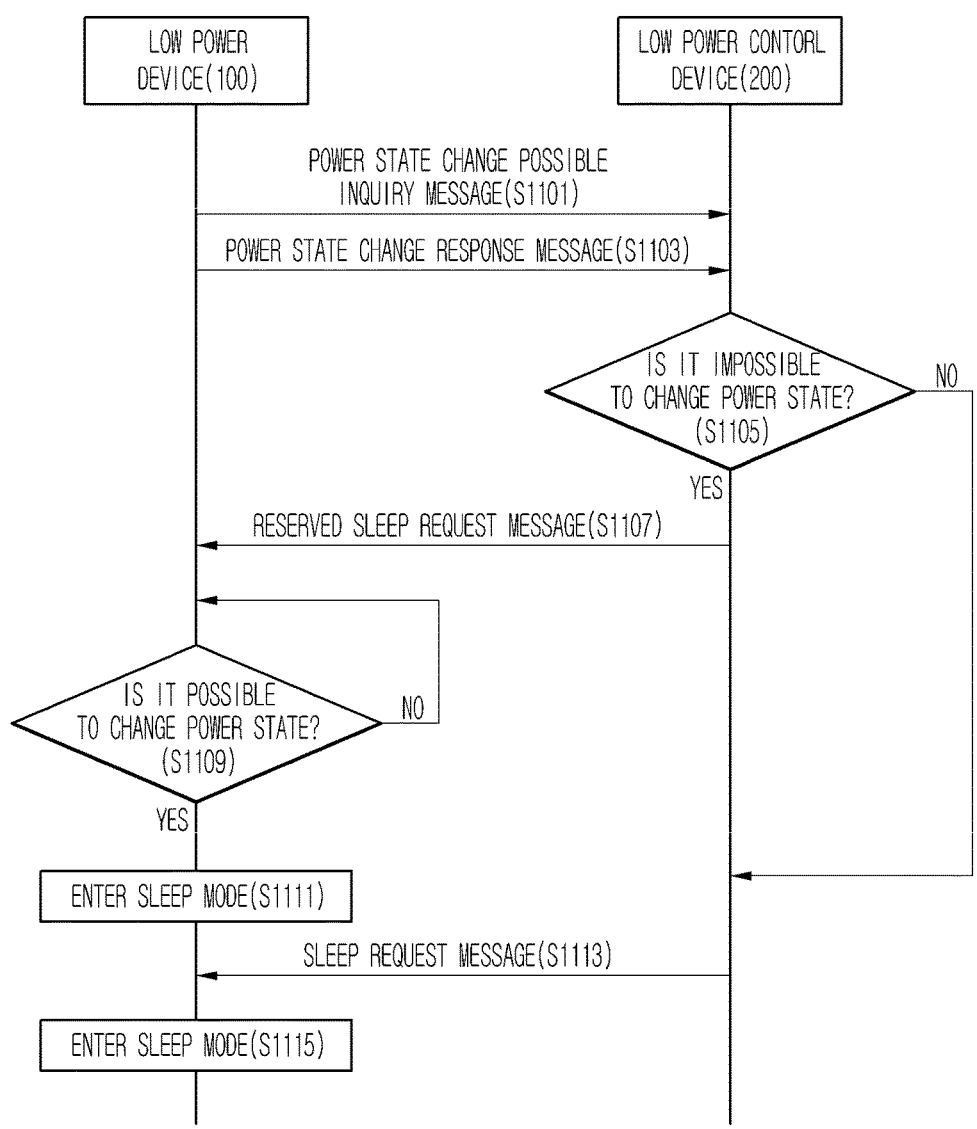
FIG. 6 is a ladder diagram for describing operating methods of a low power device and a low power control device according to another embodiment of the present invention.

FIG. 6 is a ladder diagram for describing operating methods of a low power device and a low power control device according to another embodiment of the present invention.

Referring to FIG. 6, the low power control device 200 transmits a power state change possible inquiry message that inquires the low power device 100 whether it is possible to change the power state, in step S1101. In an embodiment, the power state change possible inquiry message may be a message for inquiring whether the power state of the low power device 100 may be changed to a sleep mode. That is, the low power control device 200 may transmit to the low power device 100 the power state change possible inquiry message for inquiring whether the low power device 10 provides or receives a service. The power state change possible inquiry message may correspond to action GetCurrentConnectionID( ) of UPnP protocol.

The low power device 100 transmits a power state change response message to the low power control device 200 in response to the received power state change possible inquiry message in step S1103. In an embodiment, if the power state of the low power device 100 may be changed to the sleep mode, the low power device may transmit to the low power control device 200 the power state change response message notifying that the power state may be chanted to the sleep mode. That is, when the low power device 100 does not provide or receive a service from other equipment, it may transmit to the low power control device 200 the power state change response message notifying that the power state may be changed to the sleep mode. When the low power device 100 provides or receives a service from other equipment, it may transmit to the low power control device 200 the power state change response message notifying that the power state may not be changed to the sleep mode.

In an embodiment, the power state change response message may correspond to action ConnectionIDs of UPnP protocol.

The low power control device 200 checks through the received power state change response message whether it is impossible to change the power state of the low power device 100 to the sleep mode, in step S1105, and if positive, the low power control device 200 transmits a reserved sleep request message to the low power device in step S1107. In an embodiment, if the power state change response message corresponds to action ConnectionIDs of UPnP protocol, the low power control device 200 may determine that the low power device 100 has a power state that is impossible to be changed to the sleep mode, when a value of ConnectionIDs is not zero. That is, if the value of ConnectionIDs is not zero, the low power control device 200 may determine that the low power device 100 provides or receives a service and may thus not transmit a sleep request message to the low power device 100.

The low power device 100 receives the reserved sleep request message and checks whether it is possible to change its power state to the sleep mode, in step S1109, and if positive, the low power device 100 enters the sleep mode in step S1111. In an embodiment, action ConnectionManager:: CompleteConnection( ) of UPnP protocol may be used for the low power device 100 in order to notify that a service ends.

The low power control device 200 checks through the received power state change response message whether it is impossible to change the power state of the low power device 100 to the sleep mode, in step S1105, and if possible to change to the sleep mode, the low power control device 200 transmits a sleep request message to the low power device 100 in step S1113. In an embodiment, if the power state change response message corresponds to action ConnectionIDs of UPnP protocol, the low power control device 200 may determine that the low power device 100 has a power state that is possible to be changed to the sleep mode, when a value of ConnectionIDs is zero. That is, if the value of ConnectionIDs is zero, the low power control device 200 may determine that the low power device 100 does not provides or receive a service and may thus transmit a sleep request message to the low power device 100.

The low power device 100 enters the sleep mode according to the reception of the sleep request message in step S1115.

FIGS. 7 to 10 are user interface screens according to embodiments of the present invention.

Figure 7:
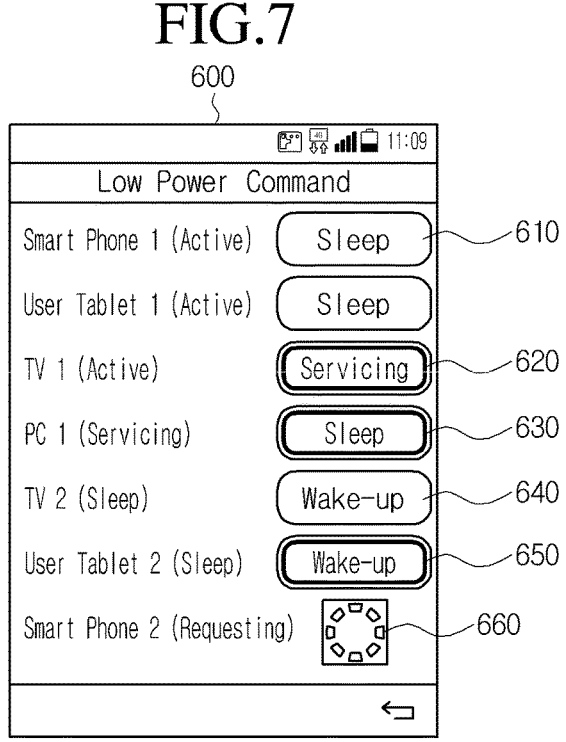
FIGS. 7 to 10 are user interface screens according to embodiments of the present invention.

Referring to FIG. 7, a user interface screen 600 may include the names of a plurality of low power devices, power states or operating states of the plurality of low power devices, and command buttons that correspond respectively to the plurality of low power devices.

A command button 610 is a button that represents an activated state in which it is possible to make a device, which is not in a low power mode, a sleep request. A user may make smart phone 1, which is in an active state, a sleep request by touching or pressing the command button 610.

A command button 620 is a button representing a state in which a sleep request may not be made although a corresponding device is not in the low power mode. A user may not press the command button 620 and may not make TV 1, which is servicing, the sleep request.

A command button 630 is a button representing an inactivated state in which a sleep request may not be made although a corresponding device is not in the low power mode. A user may not press the command button 630 and may not make PC 1, which is servicing, the sleep request.

A command button 640 is a device that is in the low power mode, and a button representing an activated state in which it is possible to make a Wake-up request. A user may press the command button 640 and make TV 2, which is in the low power mode, the Wake-up request.

A command button 650 is a device that is in the low power mode, and a button representing an inactivated state in which it is impossible to make a Wake-up request. A user may not press the command button 650 and may not make User Tablet 2, which is in the low power mode, the Wake-up request.

A requesting button 660 is a button representing a state after making Smart phone 2 a Wake-up request or a Sleep request, and may include an image representing that a request has been made.

Figure 8:
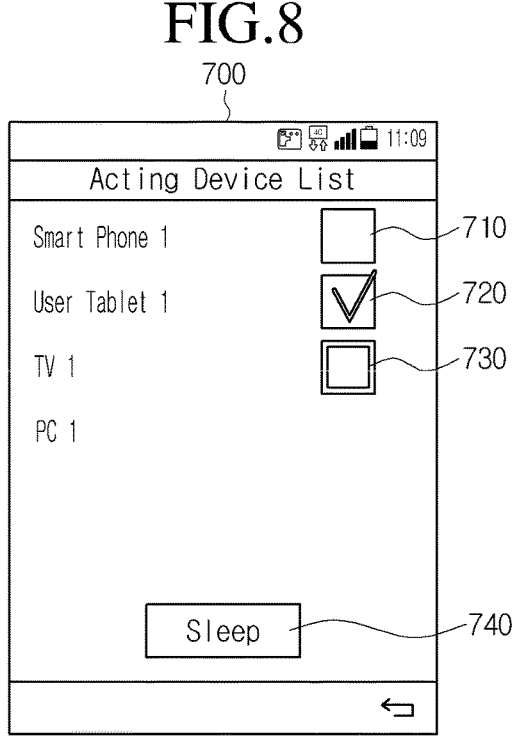

Next, referring to FIG. 8, a user interface screen 700 may include the names of a plurality of low power devices to which a sleep request may be made, and check buttons that correspond respectively to the plurality of low power devices.

A check button 710 represents a state in which a selection for making Smart Phone 1 a sleep request may be made.

A check button 720 represents a state in which a selection for making User Tablet 2 a sleep request has been made.

A check button 730 represents an inactivated state in which a selection for making TV 1 a sleep request may not be made. In order to represent that it is impossible to select the sleep request, the check button may not be displayed. If (in the case of PC 1) a state of PC 1 is changed to a state in which the sleep request is possible, the check button 710 may be displayed.

A sleep button 740 is a button for allowing the sleep request to be made. If a user presses the sleep button 740, the sleep request may be sent to selected devices.

If there is a Wake-up request, the sleep button 740 may be displayed as Wake-up and not Sleep.

Figure 9:
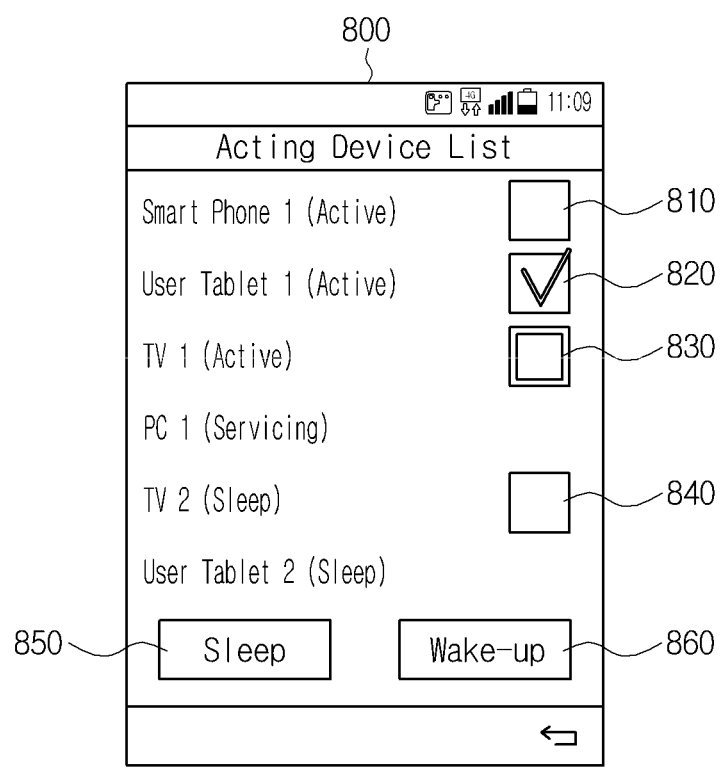

Next, referring to FIG. 9, a user interface screen 800 may include the names of a plurality of low power devices that may make a sleep request, power states or operating states of the plurality of low power devices, and check buttons that correspond respectively to the plurality of low power devices.

A check button 810 represents an activated state in which a selection for making, Smart Phone 1 that has an active state, a sleep request may be made.

A check button 820 represents a state in which a selection for making, User Tablet 1 that has an active state, a sleep request has been made.

A check button 830 represents an inactivated state in which a selection for making, TV 1 that has an active state, a sleep request may not be made. In order to represent that it is impossible to select the sleep request, the check button may not be displayed (which corresponds to the case of PC 1 that is servicing). If a state of PC 1 is changed to a state in which the sleep request is possible, the check button 810 may be displayed.

A check button 840 represents an activated state in which a selection for making, TV 2 that has a sleep state, a Wake-up request may be made. In order to represent that it is impossible to select the Wake-up request, the check button may not be displayed (which corresponds to the case of User Tablet 2 that has a sleep state). If a state of User Tablet 2 is changed to a state in which the Wake-up request is possible, the check button 810 may be displayed.

In order for the sleep and Wake-up requests to be simultaneously made, both a Sleep button 850 and a Wake-up button 860 may be displayed. If a user first selects a device to which a sleep request may be made, the Wake-up button 860 may be inactivated and a check button corresponding to a device to which a selection for a Wake-up request may be made may also be inactivated and vice versa.

Figure 10:
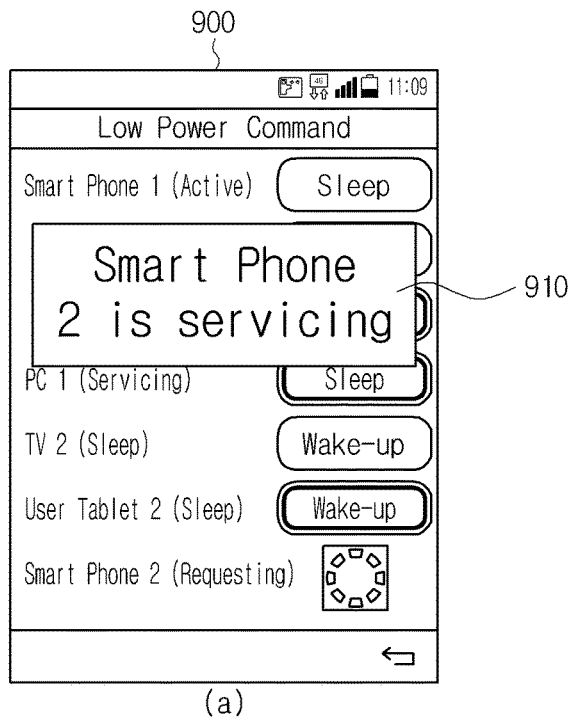
Figure 10:
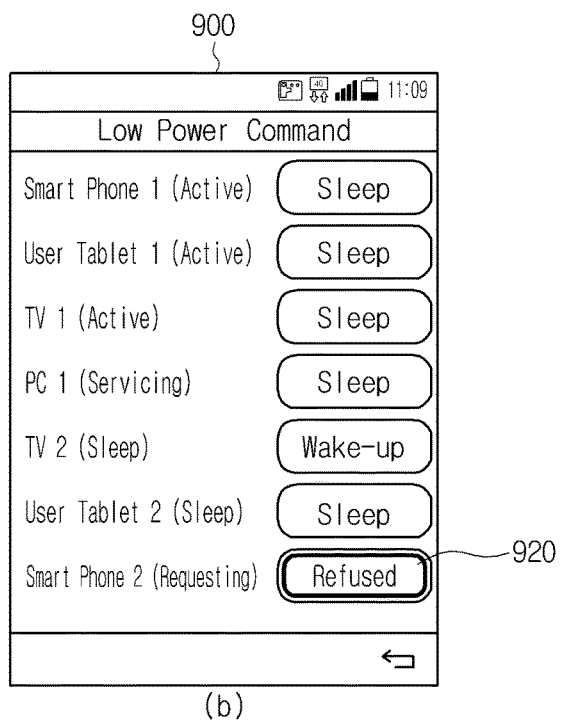

Next, referring to FIG. 10, a user interface screen 900 shows when a power state change request that a low power control device has made to a lower device is refused.

Referring to (a) of FIG. 10, when the power state change request is refused, the user interface screen 900 shows through a popup window 910 why the power state change request from a corresponding device has been refused. For example, since the Smart Phone 2 is servicing, it is possible to show through the popup window 910 why the power state change request has been refused.

Referring to (b) of FIG. 10 according to another embodiment, when the power state change request is refused, the user interface screen 900 may show through an inactivated button 920 that the power state change request for a corresponding device has been refused.

Figure 11:
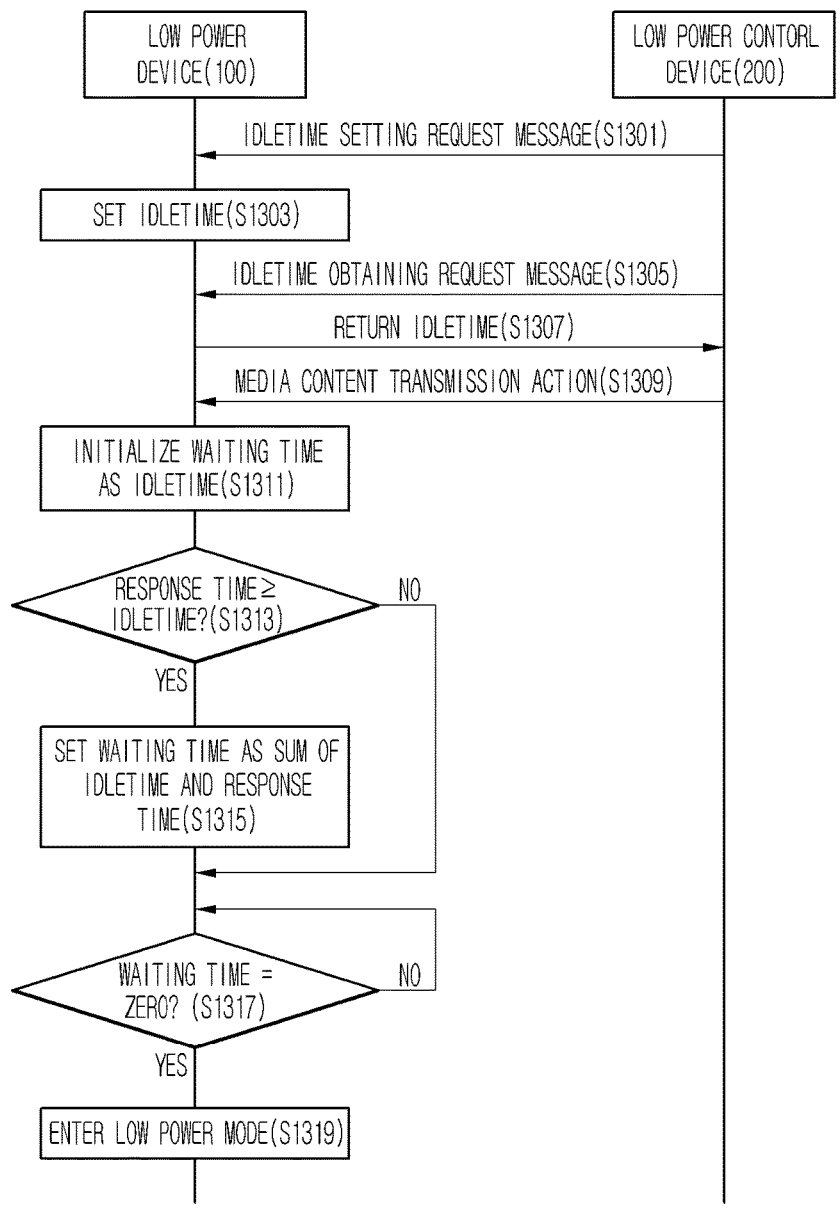
FIG. 11 is a ladder diagram for describing operating methods of a low power device and a low power control device according to another embodiment of the present invention.

FIG. 11 is a ladder diagram for describing operating methods of a low power device and a low power control device according to another embodiment of the present invention.

Referring to FIG. 11, the low power control device 200 transmits an idle time setting request message for setting when changing the power state of the low power device 100 to a low power mode, in step S1301. The idle time may indicate a time during which a power mode of the low power device 100 needs to be maintained before being changed to a low power mode. The idle time setting request message may correspond to action SetIdleTime( ) of UPnP protocol. The action SetIdleTime( ) may have one or more arguments for changes to a plurality of low power modes. Each of the plurality of arguments may correspond to a time taken when a power mode changes from an active mode to a low power mode or a time taken when a power mode changes from one low power mode to another low power mode.

The plurality of low power modes may include idle, sleep, and standby modes.

The idle mode is a servicing mode or a service request waiting mode and may be a mode that wake up by an internal or external action. The idle mode may correspond to transparent sleep of UPnP protocol.

The sleep mode is a service request waiting mode or a wakeup request waiting mode and may wake up by an internal or external action. The sleep mode may correspond to deep sleep online of UPnP protocol.

The standby mode may be a mode in which a wakeup request is waited and that may wake up by an external action. The standby mode may correspond to deep sleep offline of UPnP protocol.

If the action SetIdleTime( ) includes three arguments and each argument value has ten minutes, five minutes, and ten minutes, it may indicate that it may take ten minutes to change a power mode from the active mode to the idle mode, five minutes to change the power mode from the idle mode to the sleep mode, and ten minutes to change the power mode from the sleep mode to the standby mode. Here, the idle mode may correspond to a transparent sleep mode of UPnP, the sleep mode may correspond to a deep sleep online mode of UPnP, and the standby mode may correspond to a deep sleep offline mode of UPnP.

The low power device 100 sets an IdleTime value according to the reception of an IdleTime value setting request message in step S1303. In an embodiment, the low power device 100 may manage an IdlePeriod state variable and a WaitingTime state variable so as to change the power mode to the low power mode.

The IdlePeriod state variable may be a variable for an idle time that needs to be maintained until the power mode of the low power device 100 is changed to the low power mode.

A WaitingTime may be a waiting time until the power mode of the low power device 100 is changed to the active mode and the WaitingTime state variable may be a variable for the WaitingTime. The waiting time decreases over time and thus may become zero, and if the WaitingTime becomes zero, the low power device 100 may enter the low power mode.

The types of the WaitingTime state variable and the IdlePeriod state variable may be an integer or a time.

The low power control device 200 transmits an idle time obtaining request message so as to obtain information on when the power state of the low power device 100 is changed to the low power mode, in step S1305. The idle time obtaining request message may correspond to action GetIdleTime( ) of UPnP protocol.

The low power device 100 returns an idle time to the low power control device 200 in response to the received Idle-Time value obtaining request message, in step S1307. The low power control device 200 may check through the returned idle time of the low power device 100 when the low power device 100 changes its power state to the low power mode.

The low power device 100 receives a media content transmission action from the low power control device 200 in step S1309. In an embodiment, the low power device 100 may receive the media content transmission action from any equipment other than the low power control device 200. The media content may be audio, videos, images, etc.

The low power device 100 initializes a waiting time as an idle time in response to the received media content transmission action, in step S1311. That is, if receiving the media content transmission action, the low power device 100 may initialize the waiting time as a preset idle time. For example, if the low power device 100 receives the media content transmission action while the waiting time decreases after the idle time is set, the preset idle time may be initialized as the waiting time. That is, if the preset idle time is fifteen seconds, the waiting time decreases by one second from fifteen seconds, and if the low power device 100 receives the media content transmission action, the low power device 100 may initialize the waiting time to be fifteen seconds of the original idle time.

While the WaitingTime is initialized to be the idle time, the low power device 100 checks whether a ResponseTime to the media content transmission action is equal to or longer than the idle time, in step S1313. That is, the low power device 100 may check in response to the media content transmission action whether the ResponseTime that is a time taken to transmit media content is equal to or longer than the idle time.

If the ResponseTime is equal to or longer than the idle time, the low power device 100 sets the WaitingTime as a sum of the ResponseTime and the IdleTime, in step S1315.

Subsequently, the low power device 100 checks the WaitingTime and then checks whether the WaitingTime is zero, in step S1317.

If the WaitingTime is zero, the low power device 100 enters the low power mode in step S1319.

If the ResponseTime is shorter than the IdleTime, step S1317 is performed and it is checked that the WaitingTime is zero.

Figure 12:
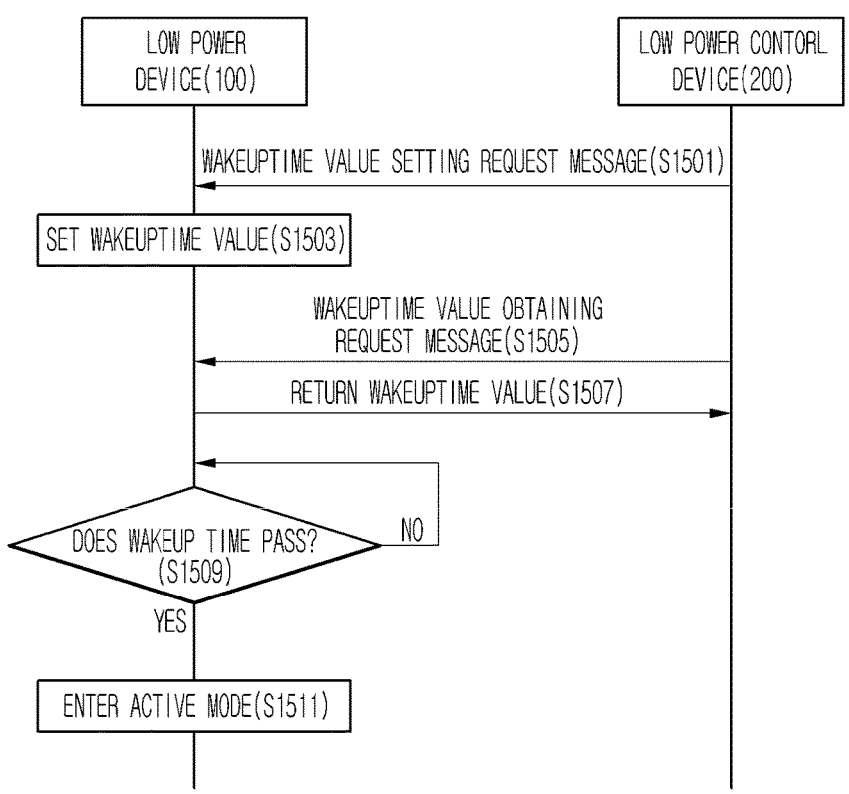
FIG. 12 is a ladder diagram for describing operating methods of a low power device and a low power control device according to another embodiment of the present invention.

FIG. 12 is a ladder diagram for describing operating methods of a low power device and a low power control device according to another embodiment of the present invention.

Referring to FIG. 12, the low power control device 200 transmits a WakeUpTime value setting request message for setting a time to change the power state of the low power device 100 to an active mode, in step S1501. A WakeUp-Time may indicate a time that needs to be maintained until the power mode of the low power device 100 is changed to the active mode.

The WakeUpTime value setting request message may correspond to action SetWakeUpTime( ) of UPnP protocol.

The low power device 100 sets the WakeUpTime value according to the reception of the WakeUpTime value setting request message, in step S1503. In an embodiment, the low power device 100 may manage a WakeupTime state Variable so as to change its power mode to the active mode. The type of the WakeupTime state Variable may be a time and may be a variable for the WakeupTime that needs to be maintained until the power mode of the low power device 100 is changed from the low power mode to the active mode.

The low power control device 200 transmits a WakeUp-Time value obtaining request message so as to obtain information on when the power state of the low power device 100 is changed to the active mode, in step S1505.

The WakeUpTime value obtaining request message may correspond to action GetWakeUpTime( ) of UPnP protocol.

The low power device 100 returns a WakeUpTime value to the low power control device 200 in response to the received WakeUpTime value obtaining request message, in step S1507. The low power control device 200 may check through the returned WakeUpTime of the low power device 100 when the low power device 100 changes its power state from the low power mode to the active mode.

Subsequently, the low power device 100 checks whether the set WakeUpTime passes, in step S1509, and if so, the low power device 100 wakes up and enters the active mode, in step S1511.

FIGS. 13 to 16 are user interface screens according to other embodiments of the present invention.

Figure 13:
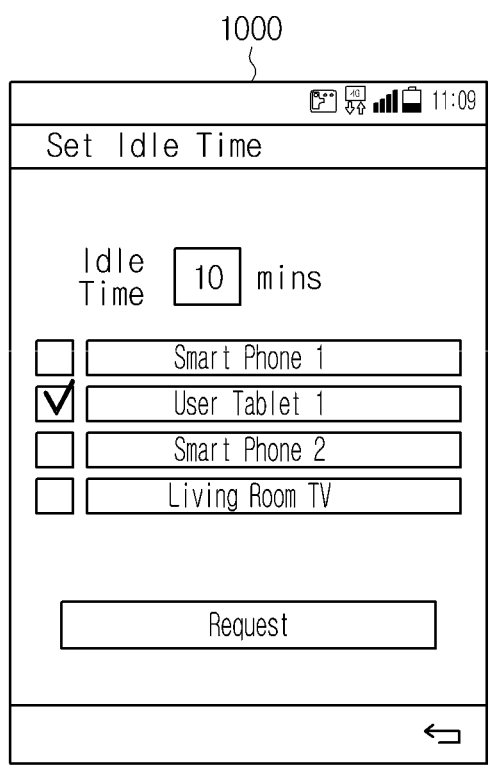
FIGS. 13 to 16 are user interface screens according to other embodiments of the present invention.
Figure 14:
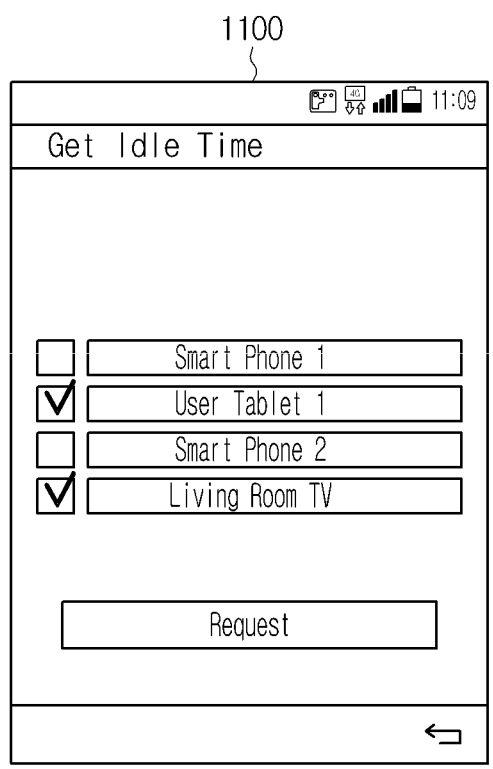
Figure 15:
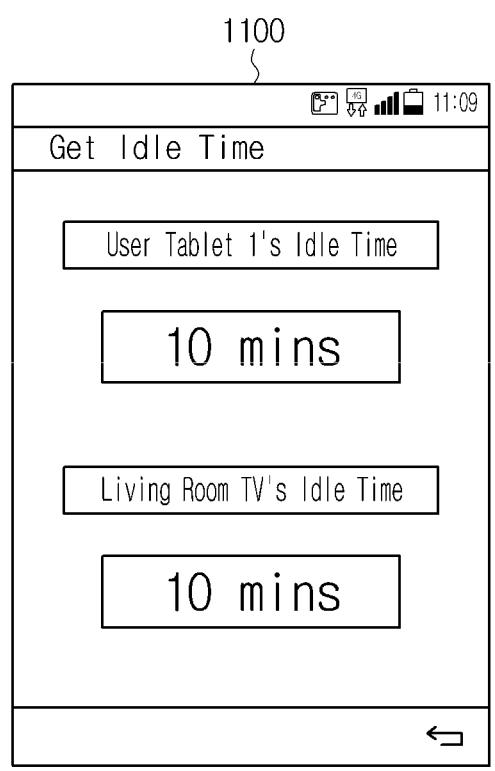
Figure 16:
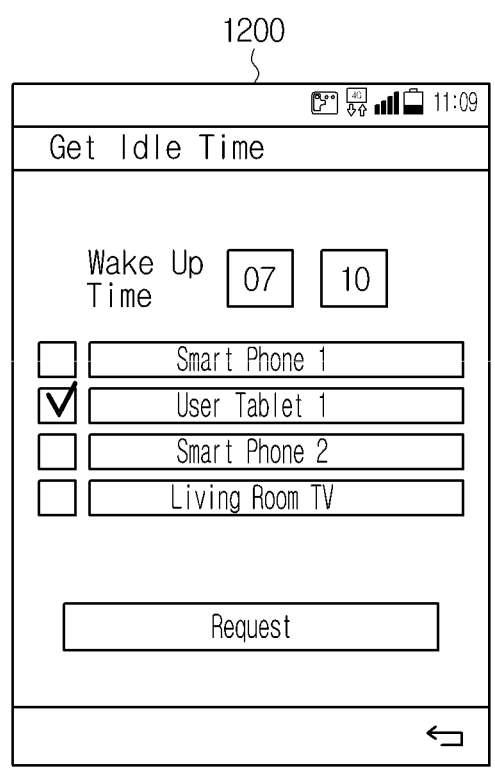

In particular, FIG. 13 shows a user interface screen for setting an IdleTime, FIG. 14 shows a user interface screen for requesting an IdleTime value, FIG. 15 shows a user interface screen for a user interface screen for representing a result corresponding to the IdleTime value request, and FIG. 16 shows a user interface screen for setting a WakeUpTime.

Referring to FIG. 13, a user interface screen 1000 may include the names of a plurality of low power devices and check buttons that correspond respectively to the plurality of low power devices. If a user enters a desired IdleTime value (10 minutes in FIG. 13), selects through a check button a device (User Tablet 1) to which the IdleTime value is set, and then presses a request button, he/she may set the IdleTime to a corresponding device.

Next, referring to FIG. 14, a user interface screen 1100 may include the names of a plurality of low power devices and check buttons that correspond respectively to the plurality of low power devices. If a user selects through a check button a device (User Tablet 1, Living Room TV) from which the IdleTime value is obtained, and then presses a request button, he/she may obtain the IdleTime for a corresponding device. Referring to FIG. 15, a result corresponding to the IdleTime value request is shown through the user interface screen 1100. That is, it may be confirmed that the IdleTime value for User Tablet 1 is ten minutes, and the IdleTime value for Living Room TV is ten minutes.

Next, referring to FIG. 16, a user interface screen 1200 may include the names of a plurality of low power devices and check buttons that correspond respectively to the plurality of low power devices. If a user enters a desired WakeupTime (07:10 in FIG. 16), selects through a check button a device (User Tablet 1) to which the IdleTime value is set, and then presses a request button, he/she may set the WakeupTime to a corresponding device.

The operations of the low power device and the low power control device for automatically changing the power mode of the low power device will be described below.

The low power device may automatically change its power mode. That is, the low power device may support an auto wake-up mechanism and an auto sleeping mechanism. Here, the device may indicate a low power device of a DLNA/UPnP type.

The low power device may manage an IdleTime state variable and change its power mode to the low power mode. The type of the IdleTime state variable may be an integer or a time.

In order to manage the IdleTime, the low power control device may manage a state variable related to a WaitingTime that decreases over time. If the WaitingTime is used up, the device may change its power mode to the low power mode.

The low power control device may set an IdleTime state variable value of the low power device through action SetIdleTime( ). The action SetIdleTime( ) having one or more arguments may have a plurality of IdleTime values so as to manage a plurality of power modes. The plurality of power modes may include Active, Transparent Sleep, Deep Sleep Online, Deep sleep Offline, Off modes.

The low power control device may obtain the IdleTime state variable value from the low power device through action GetIdleTime( ).

The low power device may initialize the WaitingTime state variable as the IdleTime when receiving other actions from other equipment. The initial value of the WaitingTime may be a default value of the IdleTime state variable or may be the IdleTime value determined by using action SetIdleTime( ). If UPnP/DLNA supports a long-term service such as an A/V media transmission, the low power device may initialize the WaitingTime state variable in consideration of a service time. The long-term service may indicate a case where the service time is longer than the initial time of the IdleTime. If the WaitingTime value is greater than the initial value, the low power device may not change its WaitingTime.

The low power device may manage the WaitingTime state variable and change its power mode from the low power mode to the active mode or ON mode. The types of the WaitingTime and the IdleTime may be an integer or a time.

The low power device may change its power mode to the active or ON mode based on the WaitingTime state variable. When the type of the WaitingTime is the integer, the low power device may change its power state to the active mode if the WaitingTime is used up. When the type of the WaitingTime is the time, the low power device may change its power state to the active mode if the current time becomes the WaitingTime.

The low power control device may set a WakeUpTime state variable value of the low power device through action SetWakeUpTime( ).

The low power control device may obtain the WakeUpTime state variable value from the low power device through action GetWakeUpTime( ).

FIG. 17 shows XML service description on various actions for changing the power state of a low power device by a low power control device according to an embodiment of the present invention.

As shown in FIG. 17, a list of actions for changing the power state of the low power device by the low power control device may include action SetIdleTime as an input factor, and action SetWakeUpTime, action GetIdleTime, and action GetWakeUpTime as output factors. The input and output factors correspond respectively to a plurality of related state variables.

Next, FIG. 18 shows XML service description on a plurality of state variables that a low power device manages.

As shown in FIG. 18, the plurality of state variables that the low power device manages may include an Idle time, a waiting time, and a wakeup time. The data type of the idle time state variable may be an integer, the data type of the waiting time state variable may also be the integer, and the data type of the WakeUpTime state variable may be a time.

Next, FIG. 19 describes a configuration of two box model equipment.

FIG. 19 is a block diagram of two box model equipment according to an embodiment of the present invention.

The two box model may include the low power device 100 and the low power control device 200.

Referring to FIG. 17, the low power device 100 may include a control unit 110, a network interface 120, a media content storage 130, and a display unit 140. The low power device 100 may include all or some of the above components.

The low power device 100 receives and processes messages correspond to a command, a request or an action from the low power control device 200. In general, the low power device 100 may be a device that stores media content, and may provide to the low power control device 200 or other low power devices 100 various media services such streaming, uploading or downloading the metadata of the media content and the media data of the media content.

The control unit 110 performs all operations of an IP based low power device 100 that are described in the specification.

The network interface 120 supports the transmission/reception of an IP based message through an IP based network. In particular, the network interface 120 may support various network interfaces such as Ethernet, WiFi, Homeplug, MoCA, HDMI, HPNA, etc. In addition, the network interface 120 supports the reception of a message that corresponds to a command, a request, or an action, and supports the transmission/reception of the metadata and media data of media content.

The memory 130 stores metadata, content, various kinds of information to be described below, and a state variable. In particular, the memory 130 may be a physical device that temporarily stores such various data.

The low power device 100 may further include a media content storage. The media content storage stores media content such as image, audio, video, audio/visual (AV) content. In particular, the media content storage may be a physical storage device such as a hard disk.

The display unit 140 displays information being processed. For example, the display unit 140 may include at least one of a liquid crystal display (LCD), a thin film transistor-liquid crystal display (TFT LCD), an organic light-emitting diode (OLED), a flexible display, and a 3D display.

The low power control device 200 may include a control unit 210, a network interface 220, a memory 230, and a display unit 240. The low power control device 200 may include all or some of the above components.

The low power control device 200 sends to the low power device 100 a message corresponding to a command, a request, or an action. Whether to transmit such a message may be determined by a user or the low power control device 200 itself. The low power control device 200 may support a user interface that carries to a user a response to the transmitted message. The user interface may correspond to the display unit 240 or a display unit of a separate device.

The control unit 210 performs all operations of the low power control device 200 that are described in the specification. The control unit 210 creates a message corresponding to the command, request, or action and sends the message to the low power control device 200 through the network interface 220.

The network interface 220 supports the transmission/reception of an IP based message through an IP based network. In particular, the network interface 220 may support various network interfaces such as Ethernet, WiFi, Homeplug, MoCA, HDMI, HPNA, etc. In addition, the network interface 220 supports the transmission of data or a message that the control unit 21 creates.

The memory 230 stores various kinds of above-described information and a state variable. In particular, the memory 230 may be a physical device that temporarily stores such various data.

The display unit 240 displays information being processed. For example, the display unit 240 may include at least one of a liquid crystal display (LCD), a thin film transistor-liquid crystal display (TFT LCD), an organic light-emitting diode (OLED), a flexible display, and a 3D display.

According to embodiments of the present invention, the above-described methods can also be embodied as processor readable codes on a medium having programs. Examples of the processor readable medium include read-only memory (ROM), random-access memory (RAM), CD-ROMs, magnetic tapes, floppy disks, and optical data storage devices, and carrier waves (such as data transmission through the Internet).

The above-described devices are not applied to the configurations and methods of the above-described embodiments in a limited manner but all or some of the embodiments may be selectively combined so that many variations may be made.

The invention claimed is:

1. A method of operating a power control device that controls a power device, the method comprising:
   subscribing an event for a change in a resource usage state of the power device, wherein the resource usage state represents a network interface mode of the power device;
   receiving the event for the change in the resource usage state of the power device if the resource usage state of the power device is changed;
   displaying an operating state of the power device on the basis of the resource usage state of the power device;
   obtaining a user input for changing the operating state of the power device; and
   transmitting to the power device an operating state change request message that requests to change the operating state of the power device according to the user input,
   wherein the displaying of the operating state of the power device comprises displaying operating states of a plurality of devices that comprises the power device.

2. The method according to claim 1, wherein a set of values that is represented by the resource usage state comprises a first state in which a resource is being used, and a second state in which the resource is not being used.

3. The method according to claim 2, wherein a set of values that is represented by the network interface mode comprises at least one of:
   a first mode in which the network interface operates,
   a second mode in which the network interface mode does not operate periodically,
   a third mode in which the network interface is down,
   a fourth mode in which the network interface is down and an IP network interface wakes up externally,
   a fifth mode in which the network interface is down and wakes up internally, and
   a sixth mode in which the network interface is down and wakes up internally or externally.

4. The method according to claim 3, wherein the first state comprises at least one of the first mode and the second mode, and
   the second state comprises at least one of the third mode to the sixth mode.

5. The method according to claim 1, wherein a set of values that the operating state represents comprises an active state and a low power state.

6. The method according to claim 1, wherein the operating state corresponds to a power state of the power device.

7. The method according to claim 1, wherein the obtaining of the user input comprises obtaining a user input for changing the operating state of the power device to a low power state, and the operating state change request message requests to change the operating state of the power device to the low power state.

8. The method according to claim 1, wherein the obtaining of the user input comprises obtaining a user input for changing the operating state of the power device to an active state, and the operating state change request message requests to change the operating state of the power device to the active state.

9. A power control device controlling a power device, the power control device comprising:

a network interface;
a control unit; and
a display unit,
wherein the control unit:
subscribes an event for a change in a resource usage state of the power device through the network interface, and receives the event for the change in the resource usage state of the power device if the resource usage state of the power device is changed,
wherein the resource usage state represents a network interface mode of the power device,
displays operating states of a plurality of devices that comprises the power device on the basis of the resource usage state of the power device through the display unit, obtains a user input for changing the operating state of the power device, and
transmits to the power device an operating state change request message that requests to change the operating state of the power device according to the user input.

10. The power control device according to claim 9, wherein a set of values that is represented by the resource usage state comprises a first state in which a resource is being used, and a second state in which the resource is not being used.

11. The power control device according to claim 10, wherein a set of values that is represented by the network interface mode comprises at least one of:

a first mode in which the network interface operates,
a second mode in which the network interface mode does not operate periodically,
a third mode in which the network interface is down,
a fourth mode in which the network interface is down and an IP network interface wakes up externally,
a fifth mode in which the network interface is down and wakes up internally, and
a sixth mode in which the network interface is down and wakes up internally or externally.

* * * * *